| United States Patent [19] | [11] Patent Number: 4,822,096 |
| Fujii | [45] Date of Patent: Apr. 18, 1989 |

[54] FRONT FRAME STRUCTURE FOR VEHICLE

[75] Inventor: Yoshio Fujii, Hiroshima, Japan

[73] Assignee: Mazda Motor Corporation, Hiroshima, Japan

[21] Appl. No.: 92,595

[22] Filed: Sep. 3, 1987

[30] Foreign Application Priority Data

Sep. 4, 1986 [JP] Japan .................. 61-209364

[51] Int. Cl.$^4$ ............................................. B62D 25/08
[52] U.S. Cl. ................................... 296/194; 296/187; 280/781
[58] Field of Search ................. 296/185, 188, 189, 194, 296/203, 204, 29, 30, 187, 193; 280/781, 785, 797, 800

[56] References Cited

U.S. PATENT DOCUMENTS

| 1,894,602 | 1/1933 | Thomas ............................ 280/800 |
| 2,386,280 | 10/1945 | Ulrich ................................ 296/194 |
| 2,636,774 | 4/1953 | Lindsay ............................ 296/204 |
| 2,669,462 | 2/1954 | Toncray et al. ............... 296/203 X |
| 2,838,322 | 6/1958 | Felts et al. ....................... 280/800 |
| 3,791,472 | 2/1974 | Tatsumi ......................... 280/785 X |
| 4,469,368 | 9/1984 | Eger ............................... 296/194 X |
| 4,573,734 | 3/1986 | Gass .............................. 296/194 X |
| 4,613,184 | 9/1986 | Rispeter et al. ............... 296/194 X |

FOREIGN PATENT DOCUMENTS

| 3603706 | 8/1987 | Fed. Rep. of Germany ...... 296/194 |
| 58-214478 | 12/1983 | Japan . |
| 0009379 | 1/1986 | Japan .................................. 296/194 |
| 922897 | 4/1963 | United Kingdom ............... 296/194 |
| 2153751 | 8/1985 | United Kingdom ............... 296/203 |

Primary Examiner—Robert B. Reeves
Assistant Examiner—Russell D. Stormer
Attorney, Agent, or Firm—Gerald J. Ferguson, Jr.

[57] ABSTRACT

A front frame structure for a vehicle has a front side frame comprising a side frame portion which has a closed cross-section and is mounted on the side wall of the engine compartment on the front side of a dashboard panel to extend in the longitudinal direction of the vehicle body, and a floor frame portion which has a channel-shaped cross-section with the open portion upward, is connected to the rear end of the side frame portion by way of a junction bent by a predetermined angle in a vertical plane, and is mounted on the lower surface of a floor panel to extend in the longitudinal direction of the vehicle body. A front reinforcement is provided in the side frame portion and a rear reinforcement is provided in the floor frame portion. The front reinforcement and the rear reinforcement are connected together near the bent junction of the side frame portion and the floor frame portion. A gusset is fixed to the junction of the front reinforcement and the rear reinforcement to partition the front side frame in the longitudinal direction thereof.

8 Claims, 3 Drawing Sheets

FRONT FRAME STRUCTURE FOR VEHICLE

BACKGROUND OF THE INVENTION

1. Field of the Invention

This invention relates to a front frame structure for a vehicle.

2. Description of the Prior Art

Generally, the front side frame of a vehicle has a side frame portion mounted on the side wall of the engine compartment to extend in the longitudinal direction of the vehicle body, and a floor frame portion which is disposed on the rear side of a dashboard frame positioned on the rear end of the engine compartment and mounted on the lower surface of a floor panel to extend in the longitudinal direction of the vehicle body.

In order to lower the floor of the passenger compartment, the floor frame portion is generally positioned lower than the side frame portion, and accordingly the junction of the side frame portion and the floor frame portion makes a bent portion inclined downward toward the rear of the vehicle body. Further, the side frame portion is generally channel-shaped in cross-section with the open portion upward on purpose to mount the floor panel on the top thereof.

In such a front side frame in which the junction of the side frame portion and the floor frame portion is bent and the floor frame portion on the rear side of the bent junction has an open cross-section of a relatively low buckling strength, the bent junction of the side frame portion and the floor frame portion is apt to buckle in a head-on collision in which the collision load acts on the front side frame from the front end of the vehicle body.

Though a reinforcement is provided in the front side frame, it is difficult to form the reinforcement as a one-piece member since the side frame portion and the floor frame portion are connected by way of the bent junction and differ from each other in cross-section. Accordingly the reinforcement is generally formed as two members, one being a front reinforcement for the side frame portion and the other being a rear reinforcement for the floor frame portion, and the front reinforcement and the rear reinforcement are connected to each other near the bent junction of the front side frame.

However, axial forces, bending forces, shearing forces and the like act on the bent portion of the front side frame in a complex combination in a head-on collision of the vehicle body, and accordingly there is a risk that the junction of the front reinforcement and the rear reinforcement will be broken by such a collision.

Though not intended to increase the strength of the front side frame, there has been disclosed in Japanese Unexamined Patent Publication No. 58(1983)-214478 a front side frame structure in which a partitioning plate is provided in the front side frame to extend in the longitudinal direction thereof and separate the inner space of the front side frame into two spaces. With this arrangement, although the strength of the front side frame is increased to some extent, it is not satisfactory.

SUMMARY OF THE INVENTION

In view of the foregoing observations and description, the primary object of the present invention is to provide a front frame structure which comprises a side frame portion and a floor frame portion connected with each other by way of a bent junction and is reinforced with a reinforcement formed by a pair of reinforcement members respectively provided in the side frame portion and the floor frame portion and connected with each other near the bent junction, and in which the buckling strength of the bent junction is improved and the joint strength of the reinforcement members is improved.

In accordance with the present invention, there is provided a front frame structure having a front side frame comprising a side frame portion which has a closed cross-section and is mounted on the side wall of the engine compartment on the front side of a dashboard panel to extend in the longitudinal direction of the vehicle body, a floor frame portion which has a channel-shaped cross-section with the open portion upward, is connected to the rear end of the side frame portion by way of a junction bent by a predetermined angle in a vertical plane, and is mounted on the lower surface of a floor panel to extend in the longitudinal direction of the vehicle body, a front reinforcement provided in the side frame portion and a rear reinforcement provided in the floor frame portion and connected to the front reinforcement near the bent junction of the side frame portion and the floor frame portion, wherein the improvement comprises a gusset fixed to the junction of the front reinforcement and the rear reinforcement to partition the front side frame in the longitudinal direction thereof.

In the front frame structure of the present invention, the gusset increases the rigidity of the bent portion of the front side frame, i.e., the bent junction of the front frame portion and the floor frame portion, especially the resistance to expansion displacement, whereby expansion deformation of the floor frame is effectively restrained when an impact load is applied to the bent portion of the front side frame in a head-on collision. Further, the gusset increases the joint strength of the front and rear reinforcements.

DESCRIPTION OF THE PREFERRED EMBODIMENT

Figure 1:
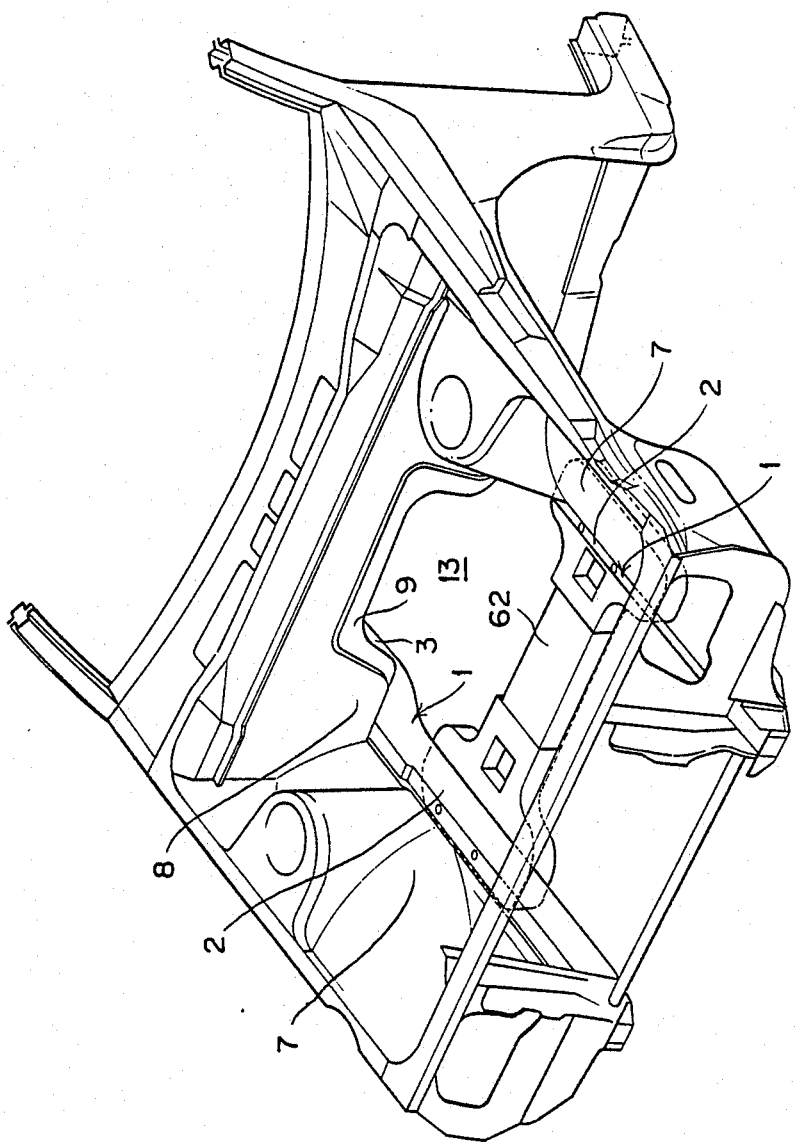
FIG. 1 is a perspective view showing a frame arrangement of the front portion of a vehicle body in which a front frame structure in accordance with an embodiment of the present invention is employed.

In FIG. 1, a front frame structure in accordance with an embodiment of the present invention comprises a pair of front side frames 1 extending in the longitudinal direction respectively from the inner sides of wheel aprons 7 to under a dashboard panel 8 and a floor panel 9.

The front side frame 1 is formed, as shown in FIGS. 1 to 4, by bonding a substantially flat outer panel 12 to an inner panel 11 having a crooked cross-section, and comprises a side frame portion 2 fixedly bonded to the wheel apron 7, which defines a side wall of an engine compartment 13, on the engine compartment side, and a floor frame portion 3 continuously extending from the rear end portion 2a (FIG. 2) of the side frame portion 2 to under the floor panel 9 disposed on the rear side of the dashboard panel 8.

The side frame portion 2 is formed of a straight beam body formed by bonding the front portion 12a (which is substantially flat) of the outer panel 12 to the front portion 11a (which has a substantially channel-shaped cross-section) of the inner panel 11 to form a closed cross-section, and is bonded to the wheel apron 7 on the outer panel side. On the other hand, the floor frame portion 3 which is bonded to the lower surface of the floor panel 9 and supports the floor panel 9 which must be disposed as low as possible in order to lower the floor of the passenger compartment substantially differs from the side frame portion 2 both in the external shape and the cross-section. That is, the floor frame portion 3 is formed by bonding together the rear portion 11b (which has a cranked cross-section) of the inner panel 11 and the rear portion 12b (which has a cranked cross-section) of the outer panel 12 to form a substantially channel-shaped cross-section which opens upward and has flange portions on opposite sides thereof. In profile, the floor frame portion 3 has a front half which is downwardly inclined toward the rear of the vehicle body from the rear end 2a of the side frame portion 2 and a rear half which horizontally extends from the lower or rear end of the front half as clearly shown in FIG. 2. That is, the front side frame 1 formed of the side frame portion 2 and the floor frame portion 3 has a substantially horizontal front portion and a substantially horizontal rear portion which are unevenly positioned and connected together by an inclined junction portion. Hereinafter, the portion including the inclined junction portion will be referred to as "the bent portion" and indicated at 20 (FIG. 2).

The front side frame 1 is reinforced with a front reinforcement 4 and a rear reinforcement 5 which are respectively provided in the side frame portion 2 and the floor frame portion 3 and are welded together. The front reinforcement 4 is formed of a beam having a substantially channel-shaped cross-section open at one side and comprising upper and lower flanges 4c and a web connecting the flanges 4b. The web 4b of the front reinforcement 4 is bent at the rear end 4a thereof toward the open side substantially to the free end of the flanges 4c and is further bent to form a rearward extension or node portion, extending substantially in parallel to the front portion of the web 4b. A first connecting portion 41 is formed on the web 4b of the front reinforcement 4 and a second connecting portion 42 is formed on the rearward extension thereof.

The rear reinforcement 5 is formed of a bent beam member having a substantially channel-shaped cross-section that opens upward and comprising outer and inner flanges connected by a web. The inner flange extends forward beyond the end of the outer flange at the front end 5a of the rear reinforcement 5 and first and second connecting portions 51 and 52 to be respectively bonded to the first and second connecting portions 41 and 42 of the front reinforcement are formed respectively on the inner and outer flanges at the front end of the rear reinforcement 5.

Figure 2:
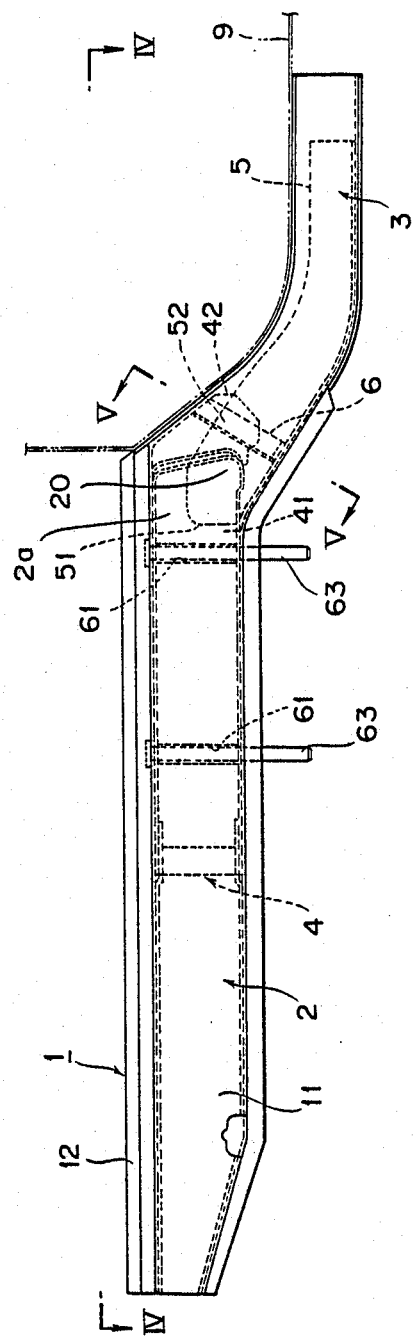
FIG. 2 is a side view showing a front side frame employed in the front frame structure shown in FIG. 1.
Figure 3:
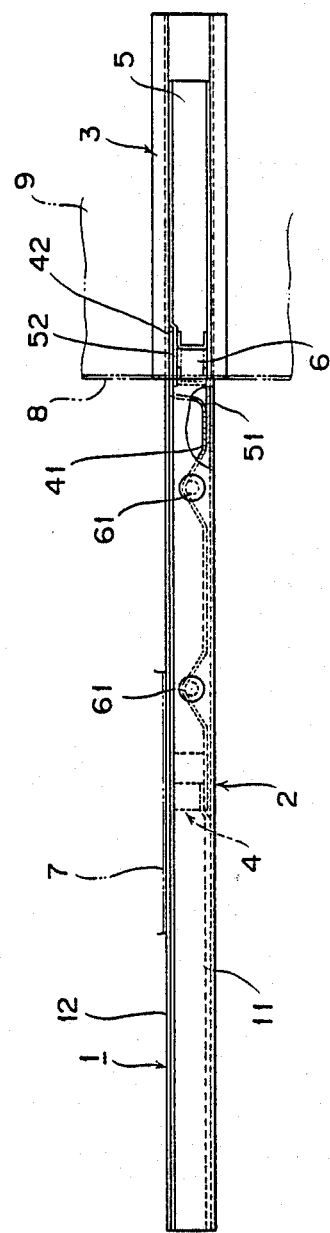
FIG. 3 is a view taken along line III—III in FIG. 2.
Figures 4, 5:
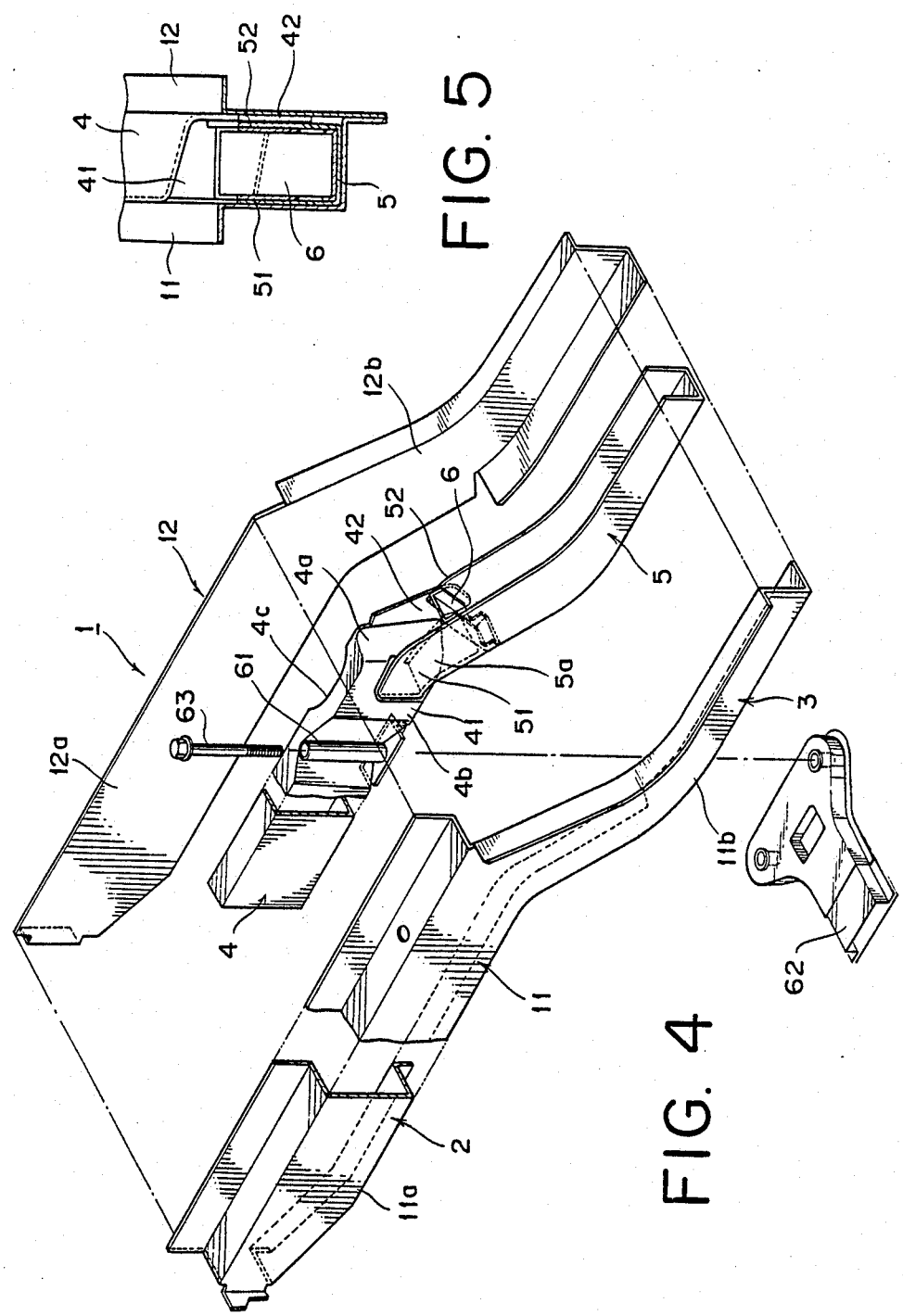
FIG. 4 is a perspective view partly exploded of the front side frame shown in FIG. 2.
FIG. 5 is a cross-sectional view taken along line V—V in FIG. 2.

The separately formed front and rear reinforcement 4 and 5 are welded together at the first connecting portions 41 and 51 and at the second connecting portions 42 and 52 at a portion corresponding to the bent portion 20 of the front side frame 1, and incorporated in the front side frame 1 (see FIGS. 2, 3 and 5).

As described above, compression, bending forces, shearing forces and the like are applied to the bent portion 20 of the front side frame 1 in a complex combination in a head-on collision of the vehicle body by the collision load acting on the side frame portion 2 s an axial force, and accordingly an excessively large stress can be concentrated on the bent portion 20 where the external shape and the cross-sectional shape of the front side frame 1 abruptly change. Therefore, the floor frame portion 3 and the rear reinforcement 5 having open cross-sections can be subjected to expansion deformation at a portion near the bent portion 20, thereby reducing to a large extent the buckling strength of the front side frame 1 and/or bonding strength between the front reinforcement 4 and the rear reinforcement 5.

In order to increase the buckling strength of the front side frame 1 and the bonding strength between the front and rear reinforcements 4 and 5, a gusset 6 having a substantially channel-shaped cross-section is provided in the junction of the front reinforcement 4 and the rear reinforcement 5, and is spot-welded to the reinforcements 4 and 5. On the outer flange side of the rear reinforcement 5, three layers are welded together, while on the inner flange side, two layers are welded together. The inner flange of the rear reinforcement 5 is further spot-welded to the inner panel 11 of the front side frame 1 at the welding area of the gusset 6 to the inner flange so that three layers are welded together at this area. On the other hand, the outer flange of the rear reinforcement 5 is not welded to the outer panel 12 in order to avoid welding together four layers and to ensure reliability of the welded portion.

The gusset 6 restrains the inner panel 11 and the outer panel 12 of the front side frame 1 from moving away from each other and restrains expansion of the rear reinforcement 5, thereby increasing the buckling strength of the front side frame 1.

Further, since not only the front and rear reinforcements 4 and 5 but also the inner panel 11 of the front side frame 1 are integrally connected by the gusset 6 at the junction of the front and rear reinforcements 4 and 5, the connecting strength of the reinforcements 4 and 5 is further increased.

The web 4a of the front reinforcement 4 is bowed toward the outer panel 12 away from the inner panel 11 at two portions, and two bolt insertion pipe members 61 are fixed to the side frame portion 2 to extend through the respective spaces between the web 4a and the inner panel 11. One end of a power unit mounting member 62 is fixed to the side frame portion 2 by a pair of bolts 63 inserted into the bolt insertion pipe members 61.

I claim:

1. A front frame structure for a vehicle having a front side frame comprising a side frame portion which has a closed cross-section and is mounted on the side wall of the engine compartment on the front side of a dashboard panel to extend in the longitudinal direction of the vehicle body and a floor frame portion which has a channel-shaped cross-section open upward including an angled segment extending downward and rearward at a predetermined angle in a vertical plane from the rear end of the said frame portion wherein the floor frame portion is mounted on the lower surface of a floor panel to extend in the longitudinal direction of the vehicle body, a front reinforcement provided in the side frame portion, a rear reinforcement provided in the floor frame portion and connected to the front reinforcement at a junction generally corresponding to the intersection of the side frame portion and the angled segment of the floor frame portion, and a gusset fixed near the junction of the front reinforcement and the rear reinforcement to partition the front side frame in the longitudinal direction thereof.

2. A front frame structure as defined in claim 1 in which said front reinforcement has a channel-shaped cross-section open at one side and said rear reinforcement has channel-shaped cross-section open upward, the rear end portion of the front reinforcement being connected to the front end portion of the rear reinforcement.

3. A front frame structure as defined in claim 2 in which said front reinforcement is connected to one vertical side wall of the side frame portion and the rear end portion of the front reinforcement is bent toward the other vertical side wall of the side frame portion to form a node portion.

4. A front frame structure as defined in claim 3 in which said gusset is provided on the rear side of the node portion to form a closed cross-section together therewith.

5. A front frame structure as defined in claim 4 in which said gusset has inner and outer flanges and at least one of the flanges is overlaid on the junction of the front end reinforcements and fixed thereto.

6. A front frame structure as defined in claim 4 in which said gusset has inner and outer flanges and a bottom flange, and the inner and outer flanges are fixed to the inner and outer flanges of the rear reinforcement and the bottom flange is fixed to the web of the rear reinforcement.

7. A front frame structure as defined in claim 2 in which a power unit mounting member is supported by the side frame portion.

8. A front frame structure as defined in claim 7 in which said power unit mounting member is fixed to the side frame portion by a bolt passing through a tubular member which extends through the side frame portion passing through a space formed by bending the web of the front reinforcement away from the closed side of the side frame portion.

* * * * *